United States Patent

Harrold

(10) Patent No.: US 6,281,861 B1
(45) Date of Patent: Aug. 28, 2001

(54) SPATIAL LIGHT MODULATOR AND DIRECTIONAL DISPLAY

(75) Inventor: Jonathan Harrold, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/787,793

(22) Filed: Jan. 23, 1997

(30) Foreign Application Priority Data

Jan. 26, 1996 (GB) .................................................. 9601618

(51) Int. Cl.$^7$ ............................................................... G09G 3/20
(52) U.S. Cl. .............................. 345/32; 345/55; 345/100; 349/95
(58) Field of Search ............................ 345/55, 22, 72, 345/76, 83, 88, 100; 349/32, 97, 106, 95; 347/135

(56) References Cited

U.S. PATENT DOCUMENTS

| | | | |
|---|---|---|---|
| 4,593,978 | 6/1986 | Mourey et al. | 350/339 |
| 4,745,406 | * 5/1988 | Hayashi et al. | 340/784 |
| 4,920,409 | 4/1990 | Yamagishi | 358/56 |
| 4,957,351 | * 9/1990 | Shioji | 350/348 |
| 4,986,637 | 1/1991 | Yamaguchi . | |

FOREIGN PATENT DOCUMENTS

| | | |
|---|---|---|
| 0194315 | 9/1986 | (EP) . |
| 0244013 | 11/1987 | (EP) . |
| 0454538 | 10/1991 | (EP) . |
| 0537853 | 4/1993 | (EP) . |
| 0625861 | 11/1994 | (EP) . |
| 2008304 | 5/1979 | (GB) . |
| 2139394 | 11/1984 | (GB) . |
| 2188183 | 9/1987 | (GB) . |
| 04237021 | 8/1992 | (JP) . |
| 9522782 | 8/1995 | (WO) . |

OTHER PUBLICATIONS

Search Report for Application No. GB 9601618.3; dated Mar. 22, 1996.
Search Report for Application No. GB 9601618.3; dated Aug. 28, 1996.
U. S. Patent Application Serial No. 08/245,584; G.J. Woodgate et al; "Spatial Light Modulator and Directional Display", filed May 18, 1994.
U.S. Patent Application Serial No. 08/674,906; J. Harrold; "Spatial Light Modulator and Directional Display", filed Jul. 3, 1996.
U.S. Patent Application Serial No. 08/788,035; Woodgate; "Autostereoscopic Display", filed Jan. 23, 1997.
U.S. Patent Application Serial No. 08/675,584; G.J. Woodgate et al. "Method of Making an SLM, SLM, Autostereoscopic Display and Backlight", filed Jul. 3, 1996.

* cited by examiner

*Primary Examiner*—Steven J. Saras
*Assistant Examiner*—John G. Lim
(74) *Attorney, Agent, or Firm*—Renner, Otto, Boisselle & Sklar

(57) ABSTRACT

A spatial light modulator for displaying M interlaced fields of image data per frame, where M is an integer greater than one, includes a plurality of picture elements and a controller for controlling the supply of image data to the picture elements. In each ith field where $1 \leq i \leq M$, image data are supplied to a plurality of ith sets of picture elements forming composite color picture elements. For each jth field where $1 \leq j \leq M$ and $i \neq j$, the image data are supplied to a plurality of jth sets of picture elements forming a composite color picture elements. Each ith set is different from each jth set and each ith set has at least one picture element belonging to a jth set.

7 Claims, 8 Drawing Sheets

— line shows a grouping for pixel (1,1) and (3,1) in phase 1 of a 2 phase addressing scheme
---- line shows a grouping for pixel (2,1) in phase 2 of a 2 phase addressing scheme Interlaced Non-interlaced —line shows a grouping for pixel(1,1) and (2,1) for 1 phase addressing — line shows a grouping for pixel (1,1) and (3,1) in phase 1 of a 2 phase addressing scheme
---- line shows a grouping for pixel (2,1) in phase 2 of a 2 phase addressing scheme ———line shows a grouping for pixel (1,1) and (4,1) in phase 1 of a 3 phase addressing scheme.

-----line shows a grouping for pixel (2,1) in phase 2 of a 3 phase addressing scheme.

——line shows a grouping for pixel (3,1) in phase 3 of a 3 phase addressing scheme.

SPATIAL LIGHT MODULATOR AND DIRECTIONAL DISPLAY

TECHNICAL FIELD OF THE INVENTION

The present invention relates to a spatial light modulator and to a directional display, such as an autostereoscopic three dimensional (3D) display.

DESCRIPTION OF THE RELATED ART

The term 'spatial light modulator' as used herein is defined to mean a device which produces as its output light whose intensity can be controlled. Thus, spatial light modulators include non-emitting devices such as liquid crystal devices (LCD) which modulate light supplied, for instance, from a backlight. However, spatial light modulators also include devices which emit light of controllable intensity, such as electroluminescent devices (ELD). Such spatial light modulators may be used in displays including two dimensional (2D) and 3D displays.

FIG. 1 of the accompanying drawings illustrates a known type of raster scan display such as in conventional television (TV) receivers having cathode ray tubes (CRT) as the display device. The video signal standard for conventional TV systems provides two fields which are interlaced to form a video frame. The display 1 is of the CRT type and FIG. 1 illustrates the raster scan pattern or path on the screen which the electron beam of the CRT follows. A first field is illustrated by bold lines such as 2 and contains the odd lines of the image. A second field illustrated by lower density lines such as 3 contains the even lines of the image. As shown in FIG. 1, the even lines 3 are interlaced between the odd lines 2 so that the two fields of each frame do not use the same picture elements (pixels) or light emitting regions of the screen of the display 1, i.e. only half of the pixels of the display are addressed in each field. This interlaced pattern was introduced in order to reduce display flicker at lower data (field) rates.

FIG. 2 illustrates progressive scanning as used in other known types of displays, such as VGA monitors. In this case, the lines 4 of each frame are scanned in order (progressively) and the same pixels or regions are scanned by corresponding lines of all frames.

FIG. 3 illustrates the layout of pixels and the colour filtering of an LCD spatial light modulator (SLM) of the type disclosed in EP 0752610. The pixels are arranged as rows and columns such that adjacent pairs of columns are contiguous in the direction of the rows. The colour filtering comprises horizontal stripes of repeating red, green and blue filters with each stripe covering a single row of pixels.

FIG. 4 of the accompanying drawings illustrates the use of the SLM 1 of FIG. 3 in an autostereoscopic 3D display. The SLM is provided with a parallax device 5 illustrated diagrammatically as a lenticular screen comprising parallel lenticules, each of which cooperates with a plurality (three in FIG. 4) of pixel columns to generate viewing windows.

Colour data for each pixel of the image to be displayed are supplied in the form of red, green and blue colour signals RGB to triplets of the SLM pixels. Triplets of RCB pixels forming composite colour pixels are indicated by the apices of triangles such as 6 and 7. Arrangements of this type are disclosed in EP 0752610. Thus, the triangle 6 shown in FIG. 3 illustrates the triplet of RGB pixels which constitute the first composite colour pixel of the first line (pixel (1,1)) of the image to be displayed whereas the triangle 7 in FIG. 3 forming the first composite colour pixel of the second line (pixel (2,1)). The SLM 1 is thus used for progressive scanning without interlacing and this technique may be referred to as 'one phase addressing'. This is indicated in FIG. 4 by die large numeral '1' appearing in the triangles 6 and 7 to indicate that each frame comprises a single field. With such an arrangement, the vertical resolution of the image is one third the vertical spatial resolution of the rows of pixels. Each pixel of the SLM 1 is addressed only once per frame.

This type of addressing to form composite colour pixels is particularly necessary for 3D autostereoscopic displays of the type illustrated diagrammatically in FIG. 4. In such a display, several images (three in the display of FIG. 4) are spatially multiplexed by displaying vertical strips of the three 2D images in the groups of three columns of pixels associated with each parallax element of the parallax device 5. In order to create an autostereoscopic full-colour image, the individual pixels of each composite colour pixel must be imaged into the same viewing zone by the parallax device 5. Thus, the columns of pixels displaying the strips of each 2D image must be in the same horizontal position relative to the corresponding parallax elements. For example, as indicated by the triangle 6 in FIG. 4, the red and blue pixels are in the left hand column behind the parallax element 5a and the green pixel is in the left hand column behind the parallax element 5b so that all three pixels are imaged into the same viewing zone by the parallax device 5.

Although it is theoretically possible to increase the vertical resolution of a display using an SLM 1 addressed as shown in FIGS. 3 and 4, there are practical difficulties. For instance, if the pixels of the SLM 1 are made to the current practical limits of spatial resolution, no further increase in resolution is possible. Also, increasing the vertical resolution by increasing the number of addressed rows can have a disadvantageous effect on display brightness or contrast. In the case of passive matrix displays, increasing the number of addressed rows directly reduces the display contrast.

SUMMARY OF THE INVENTION

According to a first aspect of the invention, there is provided a spatial light modulator for displaying M interlaced fields per frame where M is an integer greater than one, characterised by comprising a plurality of picture elements arranged in M different ways as sets of picture elements to form colour picture elements such that substantially all of the picture elements of the spatial light modulator are addressed in each of the M fields.

According to a second aspect of the invention, there is provided a spatial light modulator for displaying M interlaced fields of image data per frame where M is an integer greater than one, comprising a plurality of picture elements and a controller for controlling the supply of the image data to the picture elements such that, in each ith field where i is each integer satisfying $1 \leq i \leq M$, image data are supplied to a plurality of ith sets of picture elements such that each ith set constitutes a composite colour picture element, characterised in that the controller is arranged to control the supply of image data to the picture elements such that, for each jth field where j is each integer satisfying $1 \leq j \leq M$ and $i \neq j$, image data are supplied to a plurality of jth sets of picture elements such that each jth set constitutes a composite colour picture element, each ith set is different from each ith set and each ith set has at least one picture element belonging to a jth set.

It is thus possible to provide a spatial light modulator whose vertical resolution is effectively increased without increasing the number of picture elements. Most of the picture elements are used in each of the fields or addressing phases so that the perceived vertical resolution is greater than, for instance, the arrangement illustrated in FIGS. 3 and 4. In particular, it is possible to arrange addressing such that only (M−1) rows of picture elements are not used to display all of the M fields. The improved resolution may be achieved with little or no penalty in terms of manufacturing difficulty or cost.

Preferably each ith and jth set comprises three picture elements disposed at the apices of a triangle and each ith set has two picture elements belonging to a jth set. Such an arrangement permits conventional RGB picture elements to be used and maximises the number of picture elements used to display each of the interlaced fields in each addressing phase of the spatial light modulator.

The modulator may be embodied in LCD technology such that each picture element comprises a liquid crystal picture element. However, the modulator may also be embodied in light emitting technology, such as ELD technology, with each picture element comprising a light emitting element.

According to a third aspect of the invention, there is provided a directional display characterised by comprising a modulator in accordance with the first or second aspect of the invention and a parallax device comprising a plurality of parallax elements, the modulator comprising a plurality of columns of picture elements and each parallax element cooperating with N columns, where N is an integer greater than 1, to produce N viewing zones.

BRIEF DESCRIPTION OF THE DRAWINGS

Although such modulators are applicable to 2D displays, they may also be used in directional displays, for instance of the autostereoscopic 3D type. When SLMs using conventional addressing techniques, for instance as illustrated in FIGS. 3 and 4, are used in directional displays, there is an inevitable loss of spatial resolution compared with the use of such SLMs as 2D displays. The present techniques allow at least some of the spatial resolution to be recovered so as to provide a directional display of improved spatial resolution.

The invention will be further described, way of example, with reference to the accompanying drawings, in which.

DETAILED DESCRIPTION OF THE INVENTION

Figure 1:
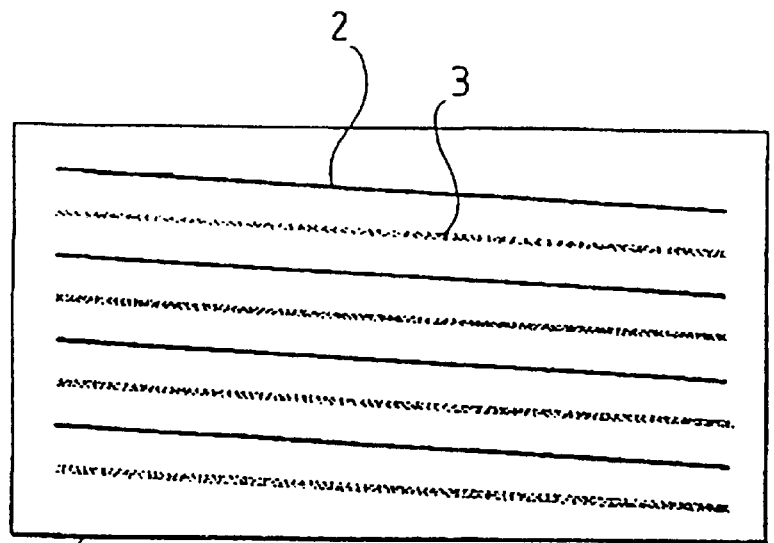
FIGS. 1 and 2 are diagrams illustrated known interlaced and noninterlaced raster scanning techniques, respectively.
Figure 2:
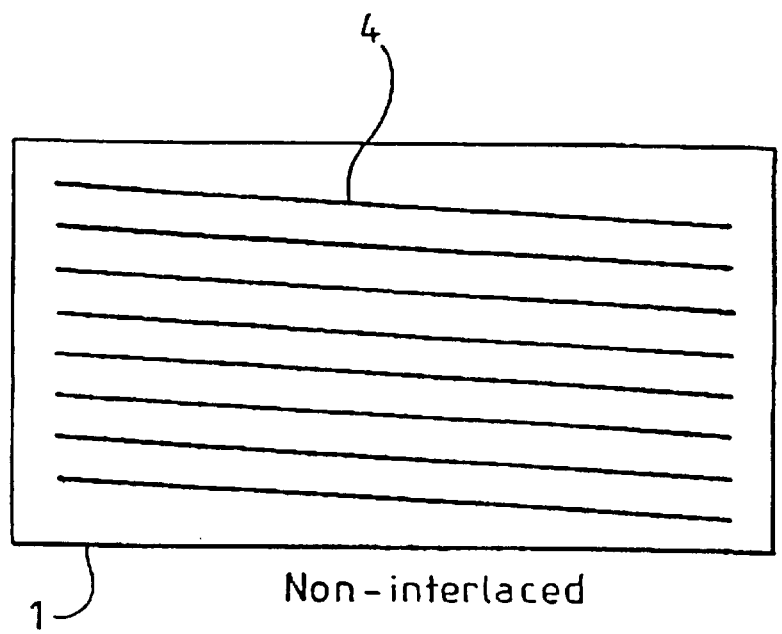

Like reference numerals refer to like parts throughout the drawings.

Figure 3:
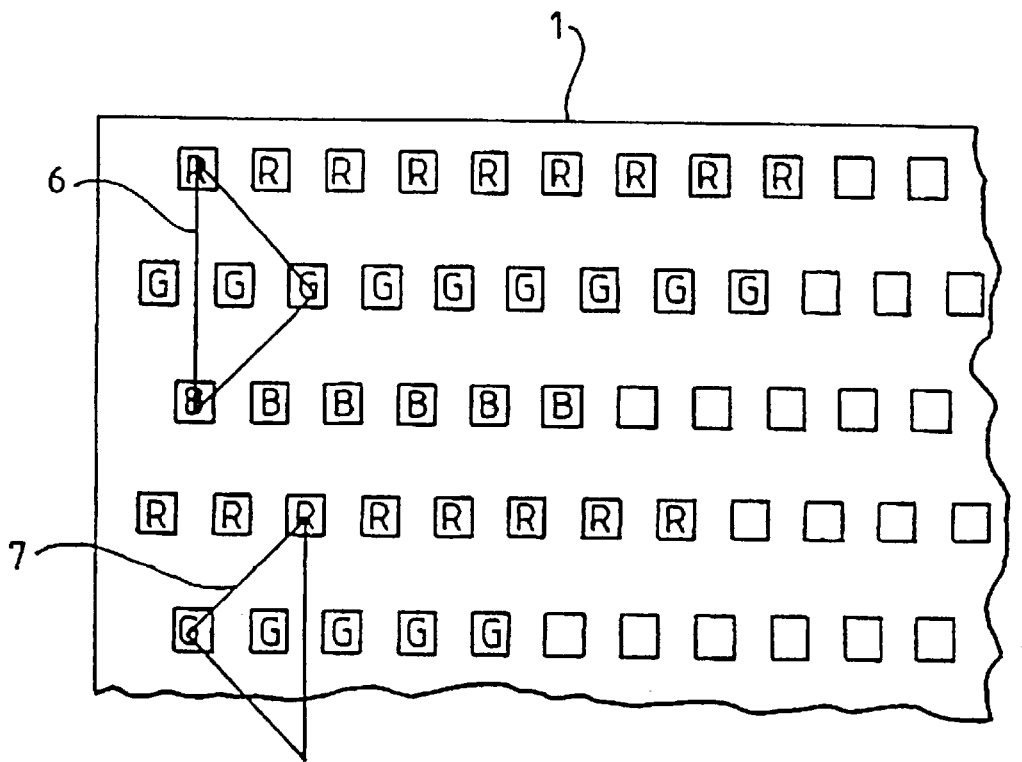
FIG. 3 illustrates use of an SLM for conventional single phase addressing.
Figure 4:
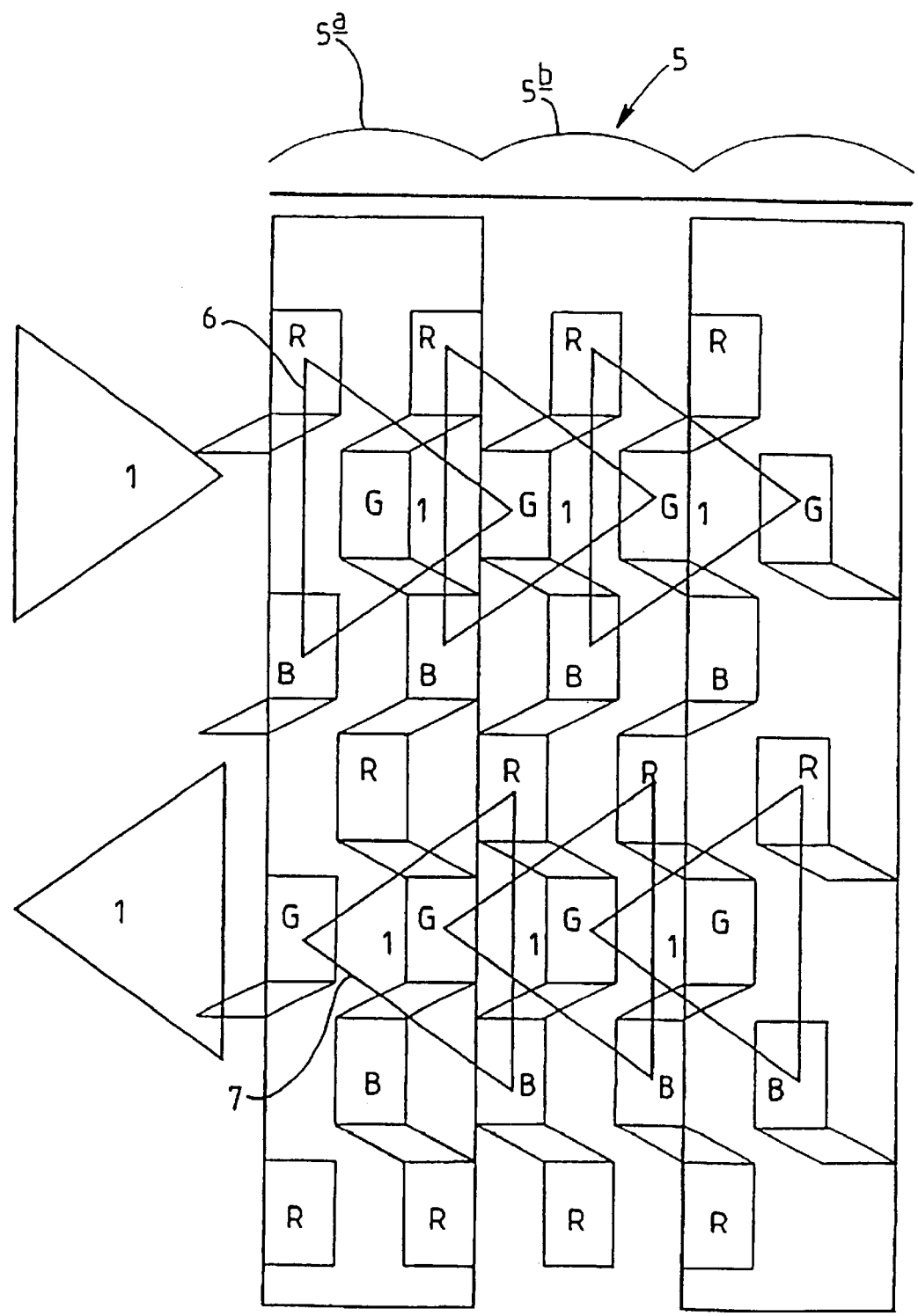
FIG. 4 illustrates diagrammatically the use of an SLM of the type illustrated in FIG. 3 as part of an autostereoscopic 3D display.
Figure 5:
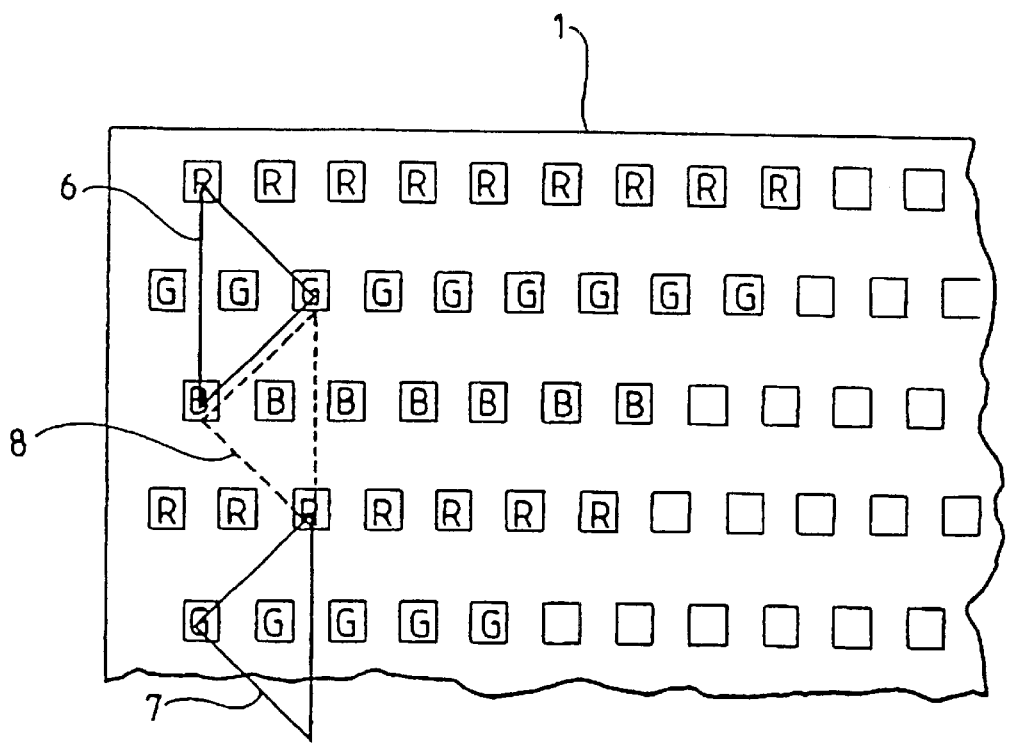
FIG. 5 illustrates an SLM using a two phase addressing scheme to provide an embodiment of the invention.

The SLM 1 shown in FIG. 5 has the pixel layout and colour filter arrangement described hereinbefore and shown in FIG. 3 but is operated in a two phase addressing scheme to display two interlaced fields per frame of video data. The triangles 6 and 7 illustrates triplets of RGB pixels forming composite colour pixels for the first and third lines of the first field in phase 1 of the addressing scheme. These triplets correspond to the single phase addressing scheme illustrated in FIG. 3.

A triangle 8 shown in broken lines illustrates a triplet of RGB pixels forming a composite colour pixel at the beginning of the second image line which is the first image line of the second field addressed in the second phase of the addressing scheme. Thus, in the second addressing phase, the green and blue pixels at the apices of the triangle 8 are the green and blue pixels at the apices of the triangle 6 used during the first phase of the two phase addressing scheme. The red pixel is not the same in the two phases.

Figure 6:
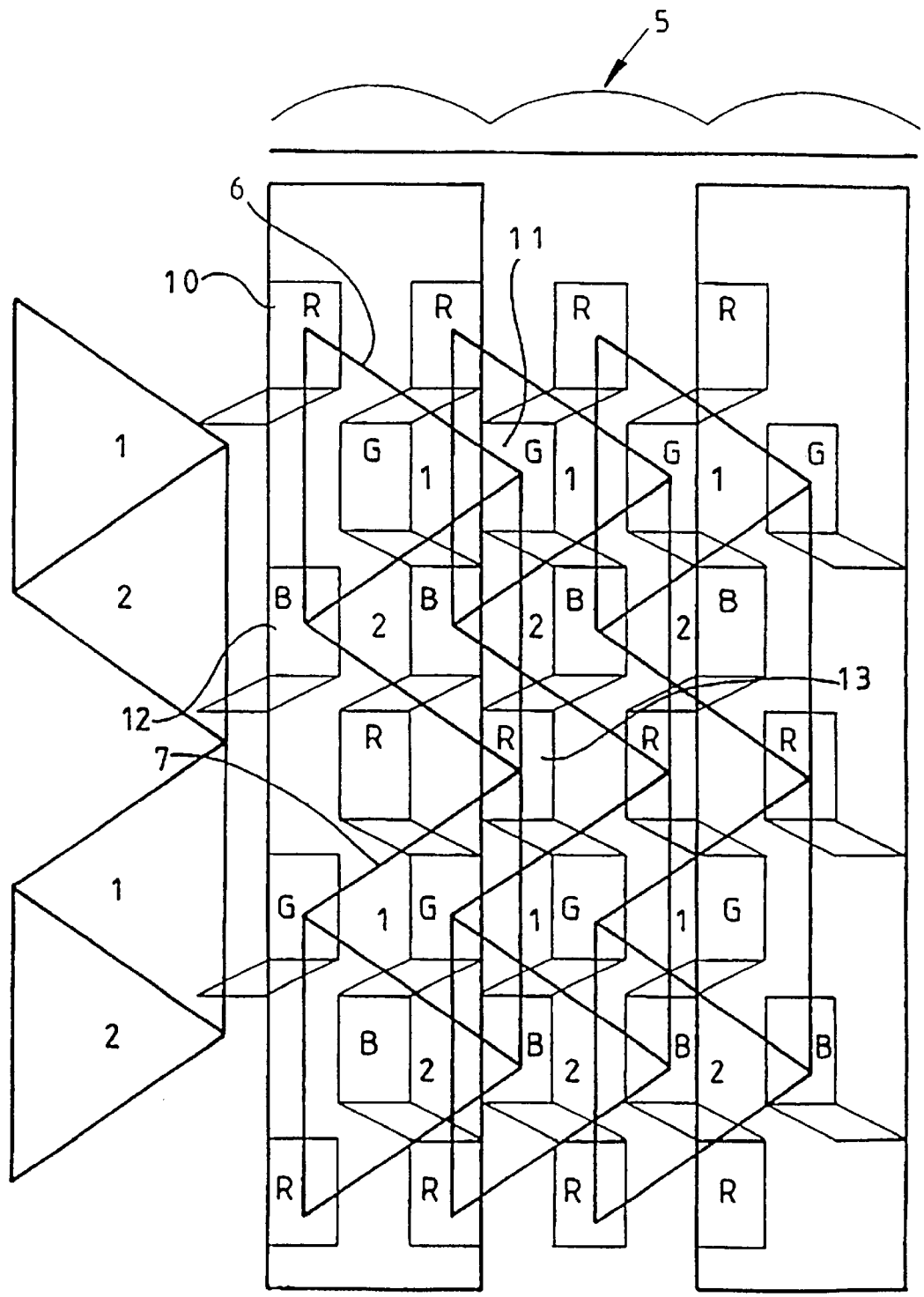
FIG. 6 illustrates the use of the SLM of FIG. 5 in an autostereoscopic 3D display.

As shown in FIG. 6, the large numerals '1' and '2' within the triangles indicate which groups of pixels are used to form the composite colour pixels in the first and second fields addressed during the first and second phases, respectively, of the two phase addressing scheme. For instance, pixels 10, 11 and 12 are grouped to provide a single composite colour pixel during the first field whereas the pixels 11 and 12 are grouped with a pixel 13 to form a composite colour pixel of the second field. Apart from the top and bottom rows of pixels, all of the pixels are addressed in each of the first and second fields but the centroids of the colour pixels in the second field are shifted vertically downwardly by one row with respect to the colour pixels addressed in the first field. This addressing scheme provides improved compatibility with interlaced 3D image signals, for instance where each 2D image is sourced from an interlaced television signal. However, unlike conventional two field addressing which leaves blank lines in alternate fields, substantially every line of the SLM is addressed in every phase.

In order to avoid image jerkiness and/or flicker, the period between addressing phases is preferably less than 0.05 seconds and more preferably less than 0.005 seconds. Each of the pixels, such as 11, 12, and 13, addressed in both the first and second phases will (in general) be addressed with different image values giving rise to different intensities if the SLM 1 is of the "fast" response type. A "fast" SLM is one in which the maximum optical response time to achieve any optical level e.g. a "black" level, a "white" level or any intermediate "grey" level, from any other optical level is less than or equal to the period between the start of consecutive addressing phases. However, where the response time is greater than this, for instance as is the case for the twisted nematic liquid crystal (TN LC) effect commonly used in SLMs, each pixel displays an R.M.S. average of the optical levels demanded by the pixel signals in consecutive addressing phases. This improves the visual perception of the display, particularly when the display is of low resolution. For instance, in the case of a nine inch display panel viewed from 0.5 meters, low resolutions would generally mean an array of pixels comprising loss than 640 by 480 pixels.

Fractional (such as one half or one third) resolution is a consequence of multi-view 3D displays where the pixels of the SLM must be shared among the actual views. For example, a 2D display comprising three million pixels will, when used as a three view 3D display, normally only have a resolution of one million pixels in each of the views. The techniques described herein provide a substantial improvement in the image quality of such autostereoscopic displays. Furthermore, as will be clear to those skilled in the art, the techniques described herein reduce the visibility of the well-known jagged or "stair-strip" line effect which is often seen when conventional displays try to display straight lines at small angles to the horizontal.

A device of this type has actually been implemented in the form of d 9 inch (approximately 22.5 centimeter) TFT colour LCD.

Thus, two fields of different information, each with the same resolution as the SLM, can be displayed with superior perceived image quality compared with repetitively displaying one field alone or displaying the two fields or data directly on top of each other i.e. with no spatial offset.

Figure 7:
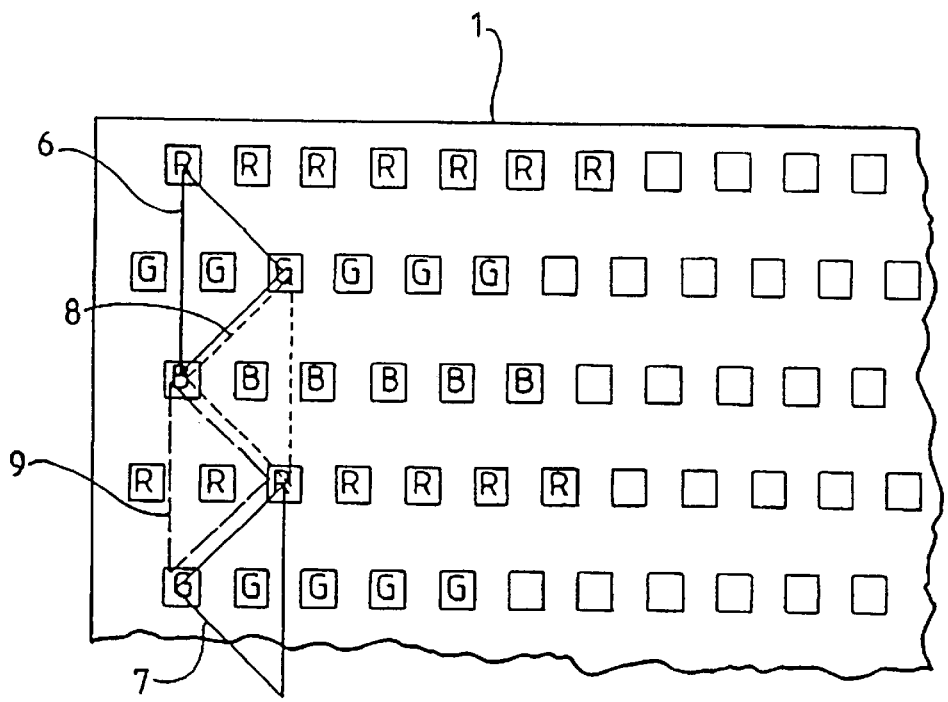
FIG. 7 illustrates an SLM operating in a three phase addressing scheme to provide another embodiment of the invention.

FIG. 7 illustrates a three phase addressing scheme in which each frame of video data comprises three interlaced fields (i.e., number of interlaced fields M=3). As in the arrangement illustrated in FIG. 5, the RGB triplets at the apices of the triangles 6 and 7 represent the first composite colour pixels (e.g., ith set) in consecutive lines of the first field (e.g., ith field) addressed in the first phase. However, the composite pixel illustrated by the triangle 7 is now the first composite colour pixel of the fourth line of the image. The RCB pixel triplet indicated by the apices of the triangle 8 again comprises the first pixel of the first line of the second field (e.g., jth field) addressed in the second phase and constitutes the first composite pixel (e.g., jth set) of the second line of the frame.

The first composite pixel of the third field addressed during the third phase is indicated by the RGB pixels at the apices of a triangle 9. This composite pixel constitutes the first pixel of the third row of the frame. In this case, all of the rows of pixels except two are addressed in all three phases of the three phase addressing scheme. For instance, an image comprising 480 lines can be divided into three interleaved 160 line images which may then be displayed by the SLM1 having 162 lines. The visual resolution is thus effectively tripled.

Figure 8:
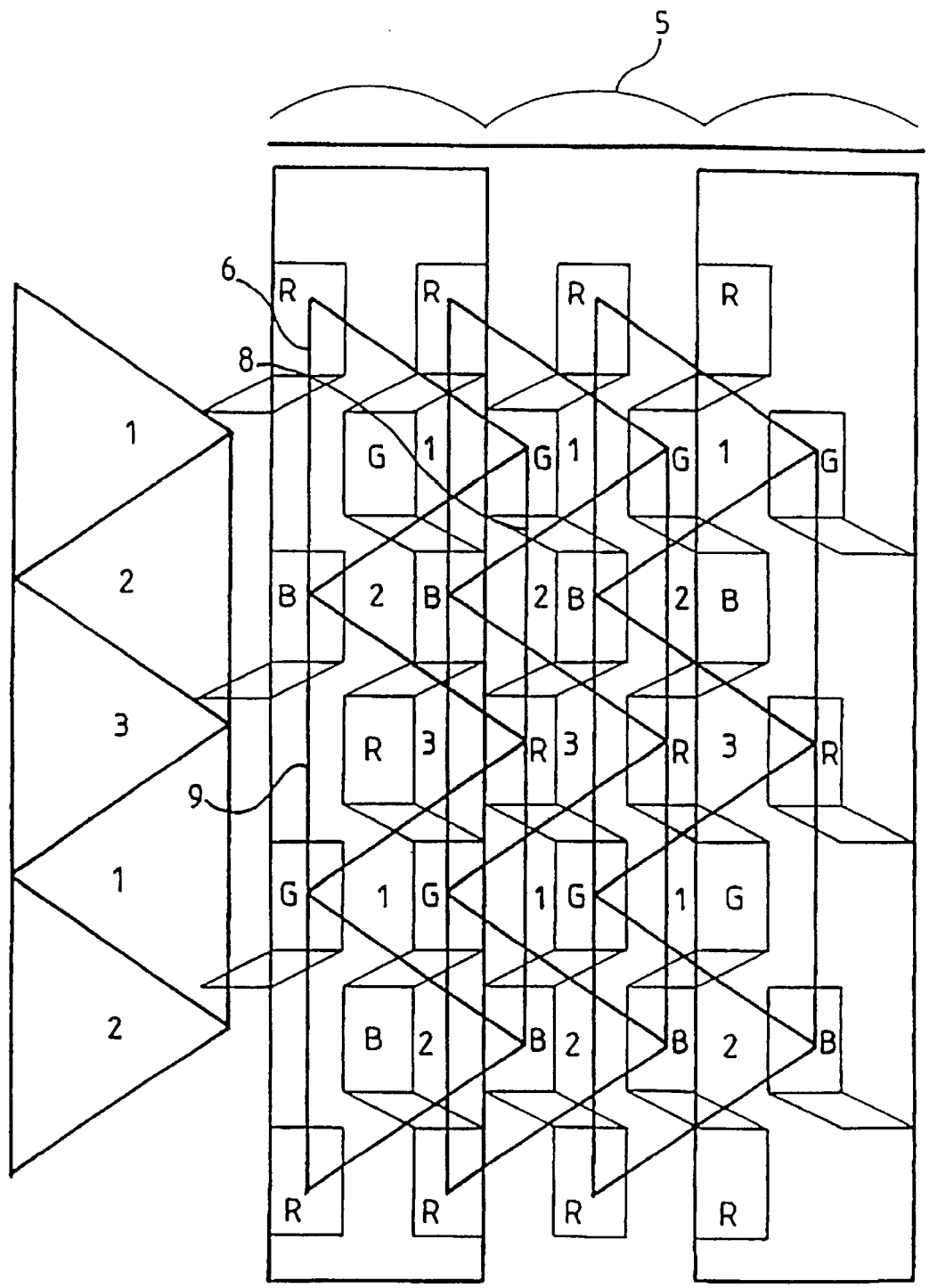
FIG. 8 illustrates the use of the SLM of FIG. 7 in an autostereoscopic 3D display.

FIG. 8 illustrates the use of the three phase addressing scheme in an autostereoscopic 3D display. The large numerals '1', '2' and '3' within the triangles again represent the triplets of pixels forming composite pixels during the first, second and third phases, respectively, of the three phase addressing scheme.

Figure 9:
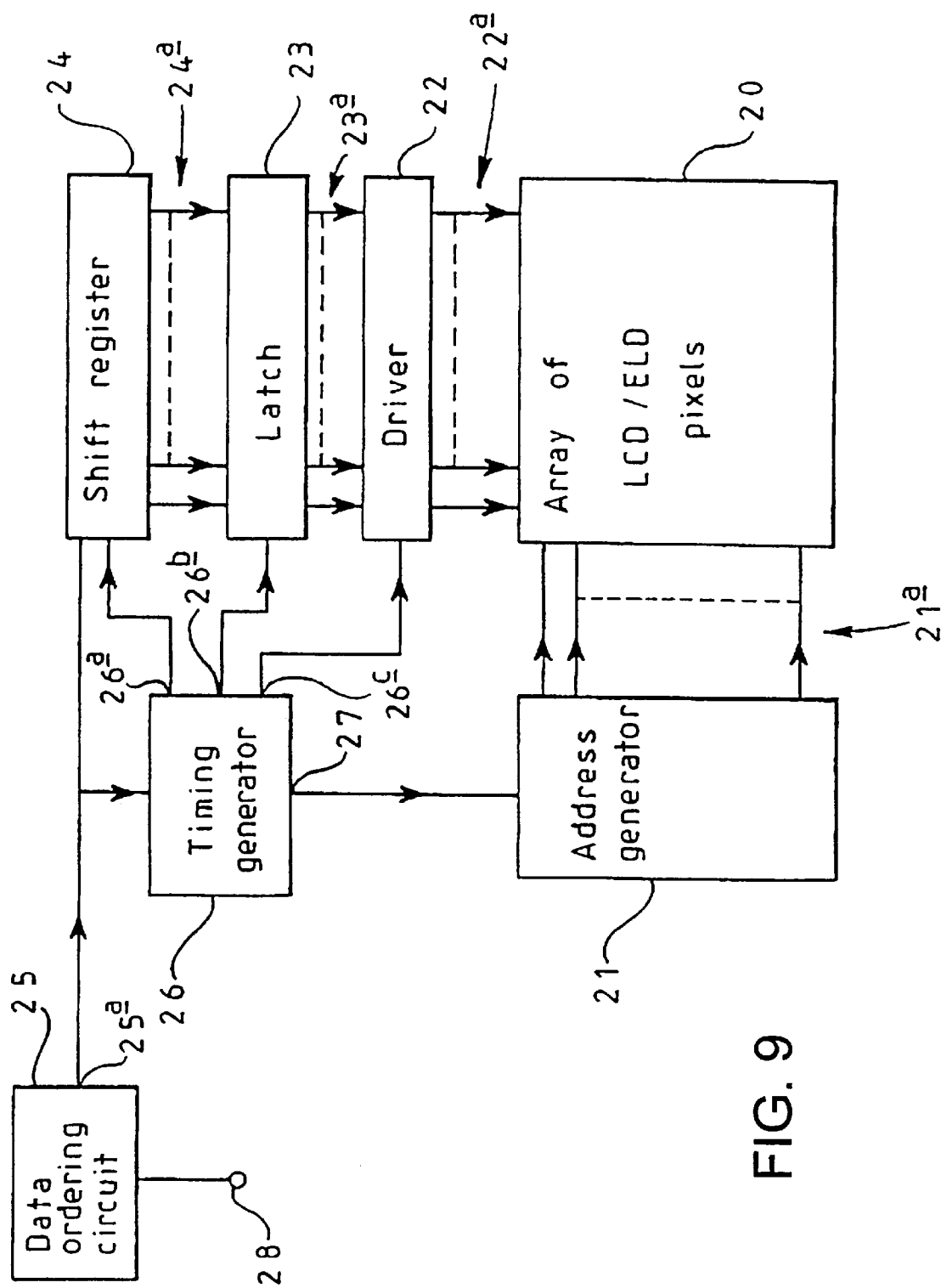
FIG. 9 is a block schematic diagram of an SLM of the type shown in FIGS. 5 to 7.

FIG. 9 is a block schematic diagram of an SLM for multiphase addressing as illustrated in FIGS. 5 to 8. The SLM comprises an array 20 of pixels arranged as rows and columns as illustrated, for instance, in FIG. 5, connected to a controller for controlling addressing of the pixels. The controller comprises an address generator 21 having a respective output 21a connected to each row electrode which is connected to all the pixels of the respective row. Similarly, a driver 22 has a respective output 22a for each column electrode connected to all of the pixels of a respective column. The driver 22 has inputs which correspond to its outputs and which are connected to the respective outputs 23a of a latch 23. The latch 23 similarly has inputs which correspond to its outputs and which arc connected to respective outputs 24a of a serial in/parallel out shift register 24. The shift register 24 has a data input connected to the output 25a of a data ordering circuit 25 for supplying video signals in the appropriate serial format for the multiphase addressing described hereinbefore.

A timing generator 26 is connected to the output 25a of the circuit 25 and converts timing signals from the video input signal to timing signals for controlling the SLM. The timing generator 26 has a first output 26a connected to a clock input of the shift register for clocking (or sampling) each video line of data serially. A second output 26b of the timing generator 26 is connected to a latch enable input of the latch 23 for enabling the latch 23 to store a next line of display data. A third output 26c of the timing generator 26 is connected to the driver 22 so as to enable the supply of the row of data to the column electrodes of the array 20. The timing generator 26 has a fourth output 27 which controls the timing of the supply by the address generator 21 of strobe signals to the row electrodes of the array 20.

The address generator 21 supplies one strobe signal at a time at its outputs so as to strobe one line of video data at a time into the array 20 of pixels. In the case of d two phase addressing scheme as illustrated in FIGS. 5 and 6, the address generator supplies strobe signals during the first phase in turn one row at a time to the rows of the array 20. When strobing of the first phase data into the array 20 is complete, the addressing generator again supplies strobe signals in sequence one row at a time to the rows of the array 20, for instance from the top to the bottom of the array 20, so as to supply the second phase of video data to the array.

The data ordering circuit 25 is shown as having an input 28, for instance for a standard video signal carrying two field interlaced image data. The circuit 25 may comprise a computer and/or frame store arranged to convert the incoming video signal into two or three field interlaced image data ordered correctly for two or three phase addressing into the array 20. The circuit 25 may be embodied as an application specific integrated circuit ASIC. The circuit may be arranged to reorder video data of other formats, which may be interlaced or non-interlaced.

In another arrangement, the circuit 25 forms part of a video source, such as a personal computer (PC), which is arranged to generate image data which are in the correct format for multiphase addressing into the array 20.

In the case of a three phase addressing scheme as illustrated in FIGS. 7 and 8, the address generator 21 supplies the strobe pulses in turn one row at a time to the rows of the array 20 during the first phase. The address generator 21 supplies the strobe signals in turn one row at a time to the rows of the array 20 during the second phase. During the third phase, the address generator 21 supplies the strobe signals in turn one row at a time to the rows of the array 20.

The SLM may employ active or passive matrix addressing with the multiphase addressing scheme described hereinbefore. Further, the array 20 may comprise light valve (non-light-emitting) or light-emitting pixels. For the light valve case, the array may be embodied as a liquid crystal device whereas, for the light-emitting case, the array 20 may be embodied as an electroluminescent device.

Although FIGS. 5 to 8 illustrate SLM's having a horizontally striped colour filter pattern with the RGB pixel triplets at the apices of triangles, the SLMs are not limited to such arrangements. Other colour filter patterning and other RGB triplet patterns could equally well be used, such as those disclosed in FIGS. 18, 19 and 20 EP 0752610. Also, such SLMs are not limited to RGB triplets but other sets, such quadruplets (for instance RGGB or RGYB where Y is a 'white' pixel) whose pixels are at the apices of quadrilaterals, could be used.

What is claimed is:

1. A directional display, comprising:
   a spatial light modulator for displaying M interlaced fields per frame where M is an integer greater than one, the spatial light modulator including a plurality of elements arranged in M different ways as sets of picture elements to form color picture elements such that substantially all of the picture elements of the spatial light modulator are addressed in each of the M fields; and a parallax device comprising a plurality of parallax elements;

wherein the modulator comprises a plurality of columns of picture elements and each parallax element cooperates with a corresponding N columns, where N is an integer greater than one, to produce N viewing zones, and where the color picture elements are each addressed as a combination of picture elements disposed in different ones of the plurality of columns.

2. A directional display, comprising:

a spatial light modulator for displaying M interlaced fields of image data per frame where M is an integer greater than one, the spatial light modulator including
 a plurality of picture elements; and
 a controller for controlling the supply of the image data to the picture elements such that, in each ith field where i is each integer satisfying $1 \leq i \leq M$, image data are supplied to a plurality of ith sets of picture elements such that each ith set constitutes a composite color picture element;
 wherein the controller is arranged to control the supply of image data to the picture elements such that, for each jth field where j is each integer satisfying $1 \leq j \leq M$ and $i \neq j$, image data are supplied to a plurality of jth sets of picture elements such that each jth set constitutes a composite color picture element, each ith set is different from each jth set, and each ith set has at least one picture element belonging to a jth set; and a parallax device comprising a plurality of parallax elements;

wherein the modulator comprises a plurality of columns of picture elements and each parallax element cooperates with a corresponding N columns, where N is an integer greater than one, to produce N viewing zones, and where the composite color picture elements are each addressed as a combination of picture elements disposed in different ones of the plurality of columns.

3. A directional display as claimed in claim 2, wherein each ith and jth set comprises three picture elements disposed at the apices of a triangle and each ith set has two picture elements belonging to a jth set.

4. A directional display as claimed in claim 2, wherein each picture element comprises a liquid crystal picture element.

5. A directional display as claimed in claim 2, wherein each picture element comprises a light emitting element.

6. A directional display as claimed in claim 3, wherein each picture element comprises a liquid crystal picture element.

7. A directional display as claimed in claim 3, wherein each picture element comprises a light emitting element.

* * * * *